US012612980B2

(12) United States Patent
Woods

(10) Patent No.: US 12,612,980 B2
(45) Date of Patent: Apr. 28, 2026

(54) CLAMP ASSEMBLY FOR DRILLING SERVICE LINES

(71) Applicant: Helmerich & Payne, Inc., Tulsa, OK (US)

(72) Inventor: Todd Woods, Perry, OK (US)

(73) Assignee: Helmerich & Payne, Inc., Tulsa, OK (US)

( * ) Notice: Subject to any disclaimer, the term of this patent is extended or adjusted under 35 U.S.C. 154(b) by 183 days.

(21) Appl. No.: 18/453,168

(22) Filed: Aug. 21, 2023

(65) Prior Publication Data

US 2024/0337332 A1 Oct. 10, 2024

Related U.S. Application Data

(60) Provisional application No. 63/495,042, filed on Apr. 7, 2023.

(51) Int. Cl.
F16L 3/10 (2006.01)
F16L 3/237 (2006.01)

(52) U.S. Cl.
CPC .............. F16L 3/105 (2013.01); F16L 3/237 (2013.01)

(58) Field of Classification Search
CPC .. F16L 3/105; F16L 3/237; H02G 3/32; F16B 7/0433
USPC ................................................ 248/68.1, 74.2
See application file for complete search history.

(56) References Cited

U.S. PATENT DOCUMENTS 2,355,742 A * 8/1944 Morehouse ........... F16L 55/035
248/68.1
2,362,124 A * 11/1944 Ellinwood ............ F16L 55/035
174/157

2,404,531 A * 7/1946 Archibald ............. F16L 3/2235
248/68.1
3,856,244 A * 12/1974 Menshen ................ F16L 3/237
248/68.1
3,920,887 A * 11/1975 Kloos ...................... H05B 3/16
174/148

(Continued)

FOREIGN PATENT DOCUMENTS

| CN | 203471633 U | 3/2014 |
| CN | 110657284 A | 1/2020 |
| CN | 112049989 A | 12/2020 |

OTHER PUBLICATIONS

PCT/US2024/023098, "International Search Report and Written Opinion", Jun. 18, 2024, 14 pages.

*Primary Examiner* — Muhammad Ijaz
(74) *Attorney, Agent, or Firm* — Kilpatrick Townsend & Stockton LLP

(57) ABSTRACT

A clamp assembly for securing service lines (such as cables, wires, hoses, pipes, etc.) for a drilling rig. The clamp assembly comprises a first clamp body (including a first piece and a first portion) and a second clamp body (including a second piece and a second portion). The first and second pieces define one or more openings adapted to removably secure service lines extending therethrough. A cam is coupled to a side of the second portion and configured to removably hold a pin in place. A bore extends through the cam and the first and second clamp bodies and a movable shaft is extended through the bore. The movable shaft is configured to move between a first and second position to removably secure the service lines. A spring is coupled to the shaft and configured to bias the first clamp body from the second clamp body.

20 Claims, 13 Drawing Sheets

(56)         References Cited

U.S. PATENT DOCUMENTS

| | | | | | |
|---|---|---|---|---|---|
| 3,967,094 | A * | 6/1976 | Petersen | H05B 3/32 | |
| | | | | 174/148 | |
| 5,060,810 | A * | 10/1991 | Jones | A47F 7/0035 | |
| | | | | 248/68.1 | |
| 5,098,047 | A * | 3/1992 | Plumley | F16L 3/2235 | |
| | | | | 248/68.1 | |
| 5,205,520 | A * | 4/1993 | Walker | F16L 3/2235 | |
| | | | | 248/68.1 | |
| 5,261,633 | A * | 11/1993 | Mastro | F16L 3/18 | |
| | | | | 248/68.1 | |
| 5,992,802 | A * | 11/1999 | Campbell | H02G 3/30 | |
| | | | | 248/68.1 | |
| 5,996,945 | A * | 12/1999 | Coles | F16L 3/2235 | |
| | | | | 248/68.1 | |
| 6,561,466 | B1 * | 5/2003 | Myers | F16L 3/221 | |
| | | | | 248/68.1 | |
| 6,968,864 | B2 * | 11/2005 | Miyamoto | B60R 16/0215 | |
| | | | | 138/108 | |
| 8,596,589 | B2 * | 12/2013 | Hennon | F16L 3/222 | |
| | | | | 248/65 | |
| 8,950,538 | B2 * | 2/2015 | Kurauchi | E02F 9/08 | |
| | | | | 172/813 | |
| 9,038,968 | B2 * | 5/2015 | Hennon | F16L 3/222 | |
| | | | | 248/65 | |
| 10,280,693 | B2 * | 5/2019 | Ferland | E21B 19/00 | |
| 10,800,540 | B2 * | 10/2020 | Gilbertson | B64D 37/32 | |
| 11,639,759 | B2 * | 5/2023 | Itokazu | H02G 3/32 | |
| | | | | 248/68.1 | |
| 12,048,991 | B2 * | 7/2024 | de Lint | B25B 5/163 | |
| 2006/0249636 | A1 * | 11/2006 | Thiedig | F16L 55/035 | |
| | | | | 248/74.1 | |
| 2014/0284432 | A1 * | 9/2014 | Shepard | F16L 3/11 | |
| | | | | 248/74.2 | |
| 2014/0291455 | A1 * | 10/2014 | Struck | F16L 57/04 | |
| | | | | 248/68.1 | |
| 2016/0178090 | A1 * | 6/2016 | Schilling | F16L 3/237 | |
| | | | | 248/316.1 | |
| 2017/0009909 | A1 * | 1/2017 | Robert, Jr. | F16L 3/1091 | |
| 2017/0030487 | A1 * | 2/2017 | Sampson | F16L 55/035 | |
| 2018/0155939 | A1 * | 6/2018 | Aldridge | E04G 7/08 | |
| 2019/0145551 | A1 * | 5/2019 | Schwalbe | H02G 3/32 | |
| | | | | 248/67.5 | |
| 2020/0032566 | A1 * | 1/2020 | Fukumoto | B65D 43/16 | |
| 2022/0057020 | A1 * | 2/2022 | Arcand | F03D 80/85 | |
| 2022/0118585 | A1 * | 4/2022 | de Lint | B25B 5/147 | |
| 2023/0042090 | A1 * | 2/2023 | Zhu | F16L 3/2235 | |
| 2024/0068598 | A1 * | 2/2024 | Nunez | F16L 3/1058 | |
| 2024/0218944 | A1 * | 7/2024 | Miller | F16L 3/105 | |
| 2024/0229975 | A1 * | 7/2024 | Jin | F16L 3/2235 | |
| 2024/0337332 | A1 * | 10/2024 | Woods | F16L 3/105 | |
| 2024/0421575 | A1 * | 12/2024 | Smith | H02G 3/32 | |
| 2025/0055270 | A1 * | 2/2025 | Leng | H02G 7/06 | |
| 2025/0102081 | A1 * | 3/2025 | Stone | F16L 3/23 | |
| 2025/0167492 | A1 * | 5/2025 | Sarault | H02G 3/32 | |

* cited by examiner

100

112

110

114

102

108

106

104

116

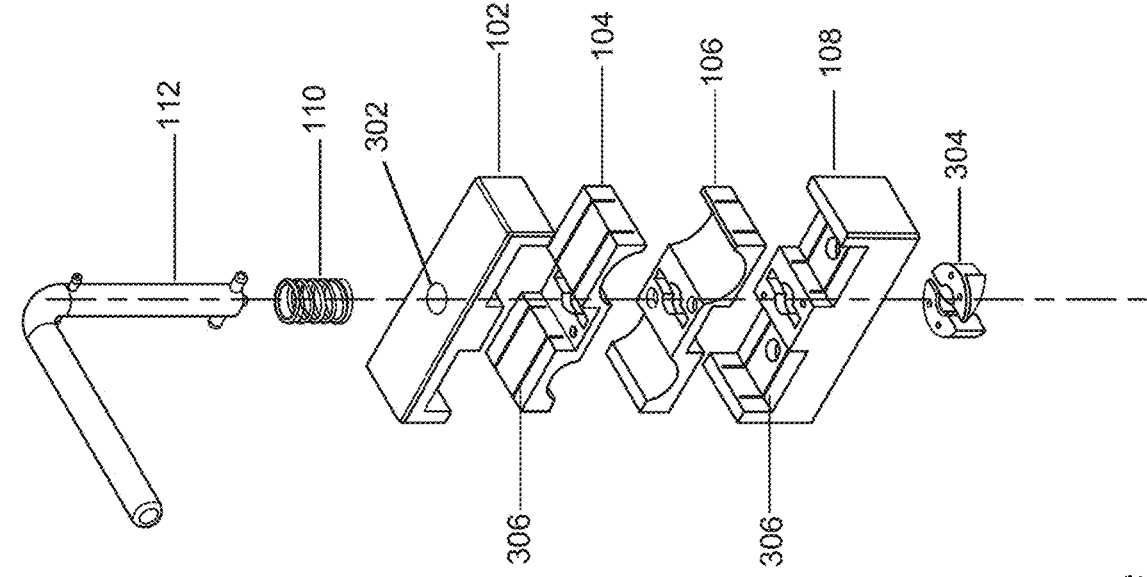
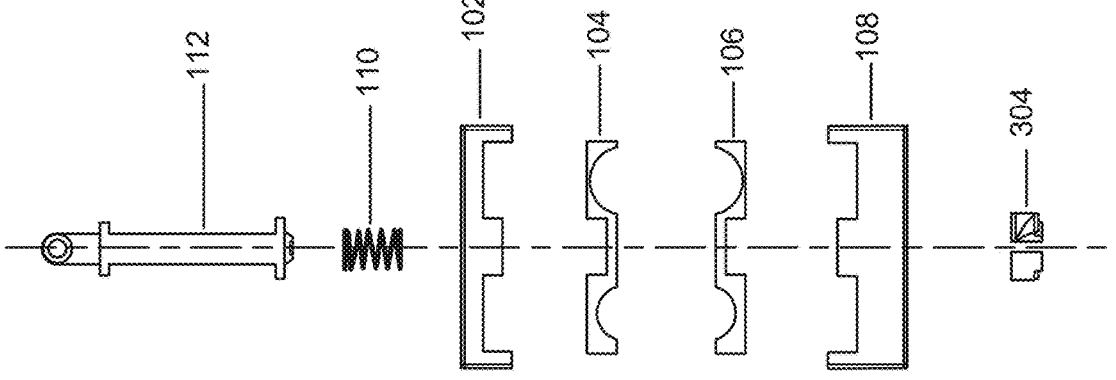
FIG. 3

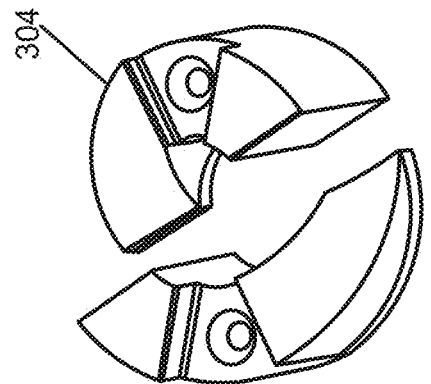
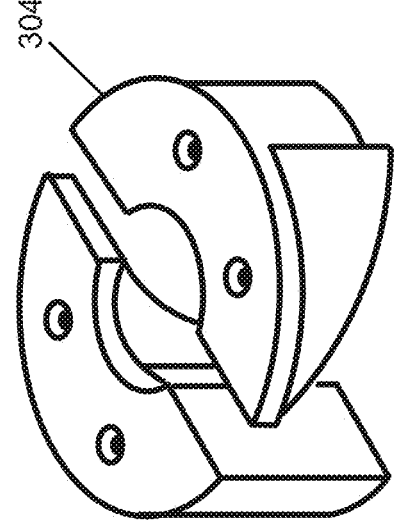
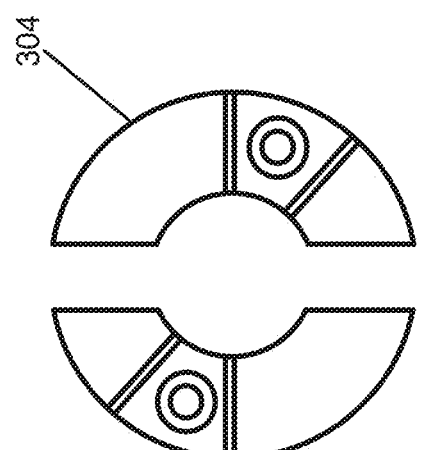
*FIG. 7*

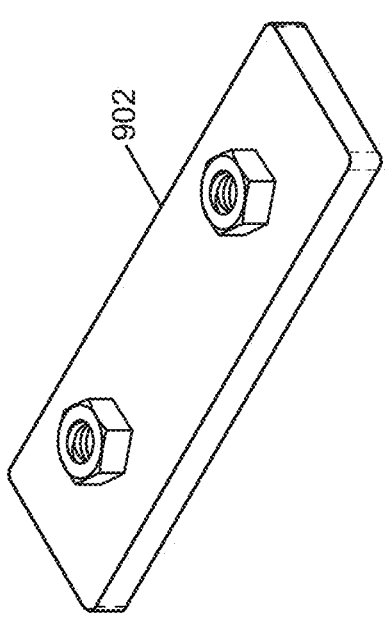
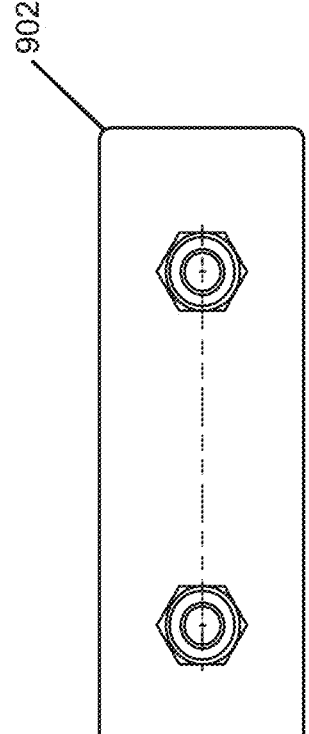
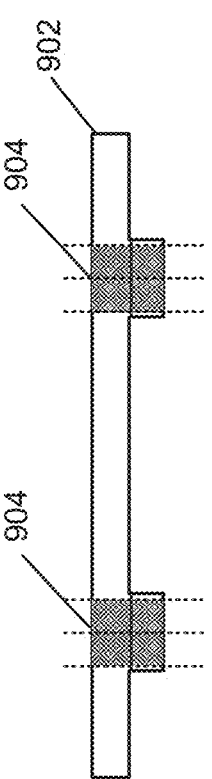
FIG. 9

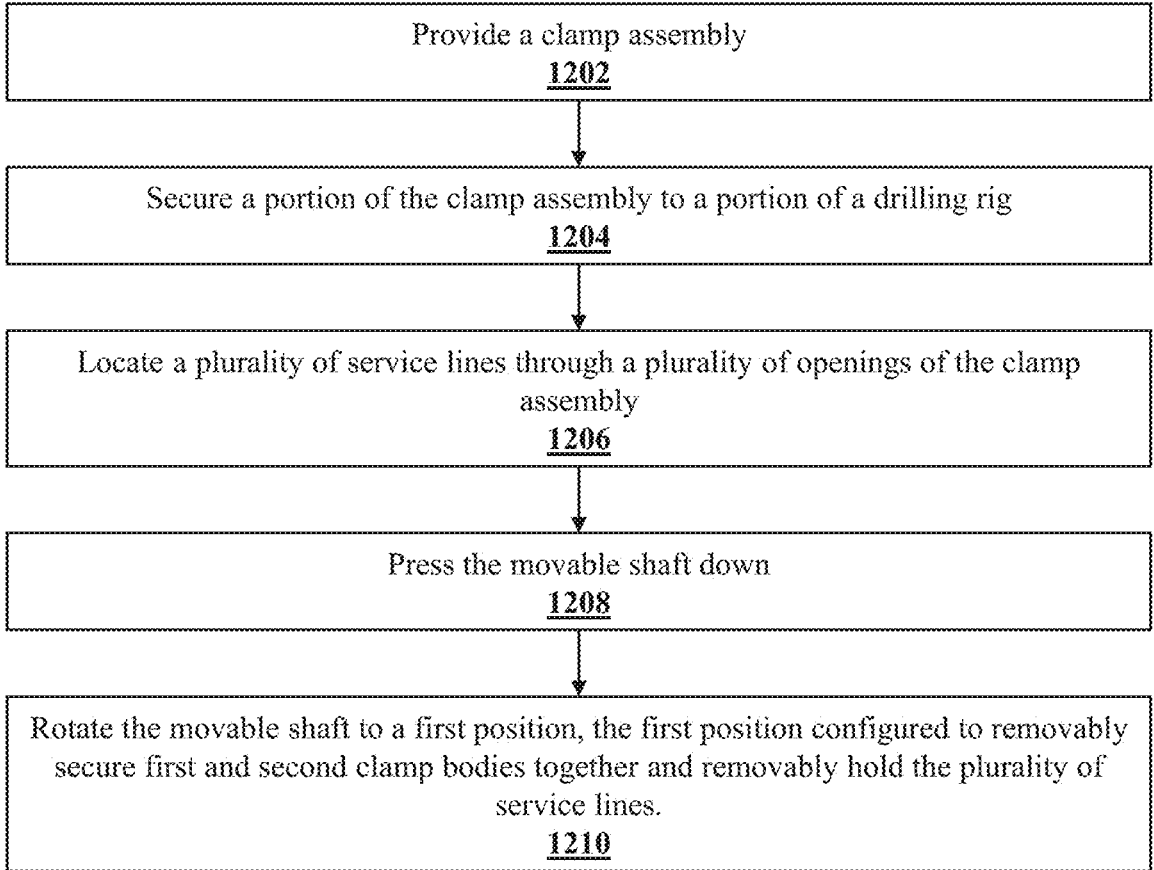

1200

Provide a clamp assembly
1202

Secure a portion of the clamp assembly to a portion of a drilling rig
1204

Locate a plurality of service lines through a plurality of openings of the clamp assembly
1206

Press the movable shaft down
1208

Rotate the movable shaft to a first position, the first position configured to removably secure first and second clamp bodies together and removably hold the plurality of service lines.
1210

Press a movable shaft of a clamp assembly down
1302

Rotate the movable shaft of the clamp assembly to a second location, the second location configured to release first and second clamp bodies and unsecure a plurality of service lines
1304

Remove the plurality of service lines located through a plurality of openings of the clamp assembly.
1306

CLAMP ASSEMBLY FOR DRILLING SERVICE LINES

CROSS-REFERENCES TO RELATED APPLICATIONS

This application claims the benefit of priority of U.S. Provisional Patent Application No. 63/495,042, filed Apr. 7, 2023, which is incorporated by reference herein in its entirety.

FIELD OF THE INVENTION

The present disclosure relates to an improved clamp assembly and methods for the quick securing of service lines providing resources such as electrical, pneumatic, hydraulic, and communication resources necessary to the operation of a drilling rig. More particularly, the invention provides a clamp assembly which can be used to quickly secure (and release) service lines on or around drilling rigs.

BACKGROUND

Drilling rigs require energy of various types to be delivered to locations across the drilling rig. The energy sources often include electrical, pneumatic, and hydraulic energy and are regularly provided by generators and pumps located in housings adjacent to the drilling rig. These energy sources and other resources, such as communication paths, are often delivered to numerous locations throughout a drilling rig being transmitted by means of service lines, including tubes, pipes, conduits, cables, and the like.

Unsecured service lines can pose a safety hazard to individuals and can serve as an obstruction impeding the movement of said individuals or equipment. Furthermore, loose service lines may be damaged or destroyed throughout the regular course of running the drilling rig. One common solution to these problems is to attach the service lines to surfaces around the drilling rig using various means, such as brackets, conventional cable, or pipe clamps.

BRIEF DESCRIPTION OF THE DRAWINGS

FIG. 3 illustrates an exploded front and isometric view of the example clamp assembly of FIGS. 1 and 2, in accordance with an embodiment of the present disclosure;

FIG. 7 illustrates a series of views of the exemplary cam of a clamp assembly, in accordance with an embodiment of the present disclosure;

FIG. 9 illustrates a series of views of an exemplary base piece of a clamp assembly, in accordance with an embodiment of the present disclosure;

FIG. 12 illustrates a flow for using an example clamp assembly to secure service lines, in accordance with an embodiment of the present disclosure.

DETAILED DESCRIPTION

Figure 1:
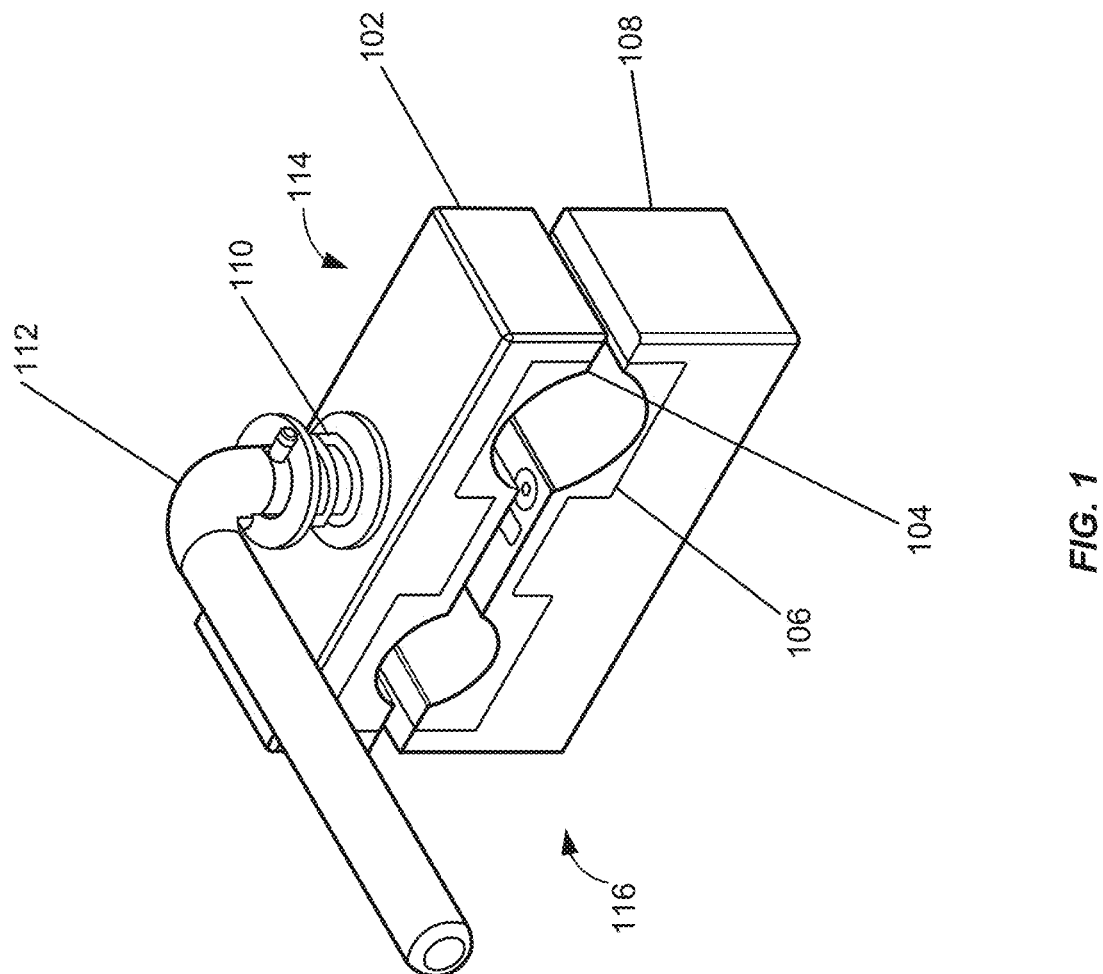
FIG. 1 illustrates an isometric view of an example clamp assembly, in accordance with an embodiment of the present disclosure.

In the following description, various embodiments will be described. For purposes of explanation, specific configurations and details are set forth in order to provide a thorough understanding of the embodiments. However, it should be noted that the embodiments may be practiced without the specific details. Furthermore, well-known features may be omitted or simplified in order not to obscure the embodiment being described.

Techniques disclosed herein are related to a quick connect (and disconnect) hose clamp for securing service lines for a drilling rig. According to various embodiments, the service lines can include, but are not limited to, cables, wires, pipes, etc. and may provide various resources, such as electrical, hydraulic, pneumatic, and communication services. The service lines may be held using one or more quick connect clamps allowing the lines to be safely secured and organized. More specifically, techniques disclosed herein provide a first clamp body, which can be comprised of two interconnected pieces, a first portion and a first piece. Additionally, a second clamp body is provided and can be comprised of a second portion and a second piece. The first and second pieces may define at least one or more openings of a desired shape and size to removably secure service lines (e.g., cables, wires, pipes, etc.) extending therethrough. A bore may extend through the first and second clamp bodies and a cam may be coupled to the second portion and configured to removably hold a pin in place when a movable shaft is set to a first position. Moreover, a moveable shaft is provided and may extend through the bore provided. The shaft includes at least the pin, which can be removably located in the cam, and can be configured to move between at least the first position and a second position to removably close the clamp and thereby secure service lines therein. The shaft can be configured such that when it is in the first position it removably holds the first and second clamp bodies together, which, in turn, removably holds service lines therethrough. Finally, a spring coupled to the shaft is provided and can be configured to bias the shaft away from the clamp body and to provide the necessary tension to secure the service lines.

Several illustrative embodiments will now be described with respect to the accompanying drawings, which form a part hereof. The ensuing description provides embodiment(s) only and is not intended to limit the scope, applicability, or configuration of the disclosure. It is understood that various changes may be made in the function and arrangement of elements without departing from the spirit and scope of this disclosure. In the following description, for the purposes of explanation, specific details are set forth in order to provide a thorough understanding of certain embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Embodiments of the present disclosure are directed to, among other things, a clamp assembly and method of implementing said clamp assembly to secure a plurality of service lines (e.g., cables, wires, pipes, etc.) for a drilling rig. The present disclosure provides a clamp assembly implementing a cam and spring mechanism paired with a handle and/or tool allowing for quick engagement (or disengagement) of the clamp assembly when securing (or de-coupling) service lines. For example, a rotational force may be applied to a movable shaft coupled with a clamp assembly to engage the clamp assembly and secure one or more service lines. Furthermore, application of force to the movable shaft may also disengage the clamp assembly, which, in turn, may releases the service lines held.

FIG. 1 illustrates an isometric view of an example clamp assembly 100, in accordance with an embodiment of the present disclosure. An exemplary clamp assembly 100, as illustrated in FIG. 1, may include a first clamp body 114 and a second clamp body 116. In some embodiments, the first clamp body 114 and the second clamp body 116 may each be manufactured as single pieces, such that the first clamp body 114 is couplable to the second clamp body 116. For example, the first clamp body 114 may be manufactured and configured to be couplable to the second clamp body 116 which may be manufactured separately.

In another embodiment, the first clamp body 114 may be comprised of a first portion 102 and a first piece 104, as illustrated in FIG. 1. The first portion 102 and first piece 104 may be manufactured separately and combined to form the first clamp body 114. For example, the first portion 102 may be manufactured separately from the first piece 104, which may be used to establish the first clamp body 114. In an additional embodiment, the second clamp body 116 may be comprised of a second portion 108 and a second piece 106. Similar to the first clamp body, the second clamp body 116 may be separately manufactured in two portions, the second portion 108 and the second piece 106, which may then be coupled to create the second clamp body 116.

Figure 2:
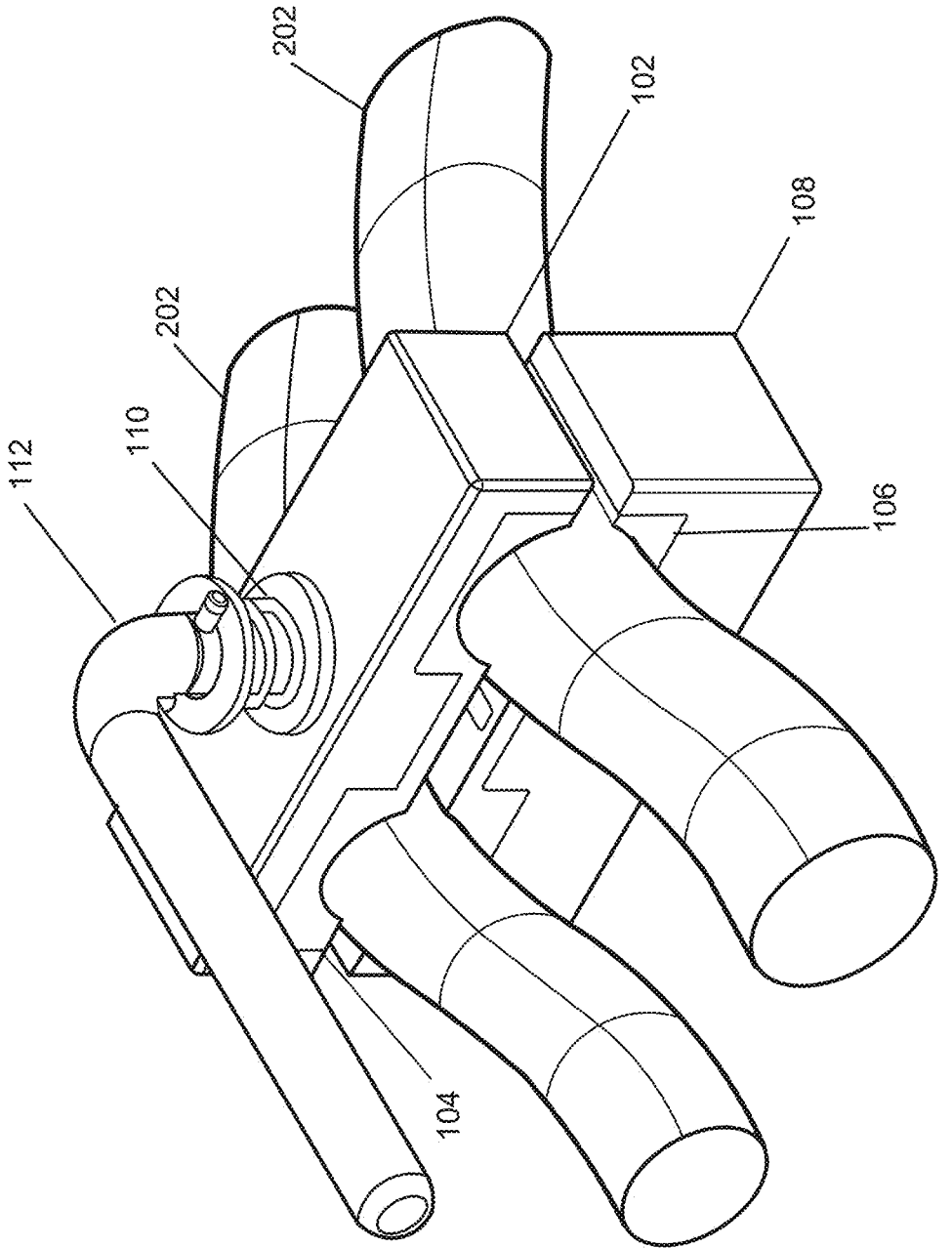
FIG. 2 illustrates an isometric view of the example clamp assembly of FIG. 1 removably holding a plurality of service lines, in accordance with an embodiment of the present disclosure.

The first and second pieces (104, 106) of the clamp assembly 100 may define one or more openings. The openings may be adapted to removably secure service lines 202 (e.g., cables, wires, pipes, etc.) that extend therethrough, as illustrated in FIG. 2. For example, a portion of a service line 202 may be located in the opening defined by the first and second pieces (104, 106). When the clamp assembly 100 is engaged, the first and second pieces (104, 106) are closed and securely hold the service line 202 in place. By securing the one or more service lines 202 in locations defined by the clamp assembly 100, potential safety hazards and/or obstacles may be removed from high trafficked areas of a drilling rig. In another embodiment, the openings may be the same diameter, allowing the openings to couple to similar sized service lines 202. Alternatively, and/or additionally, the openings may be of different size and/or shape (e.g., circular, elliptical, rectangular, etc.), capable of securing different sized and/or shaped service lines 202.

In one embodiment, clamp assembly 100 may include a bore 302 which extends through the first and second clamp bodies (114, 116), as illustrated in FIG. 3. The bore 302 may be located at a central axis of the first and second clamp body (114, 116) or may be at one of the two ends thereof. Additionally, and/or alternatively, the bore 302 may be located at an offset to the central axis of the first and second clamp body (114, 116). In an additional embodiment, a moveable shaft 112 may be provided and coupled with the first and second clamp body (114, 116) by passing the moveable shaft 112 through a bore 302. The movable shaft 112 may be in the form of an L-shape, as illustrated in FIG. 1, however it may take any suitable shape that provides a graspable shaft 112 to engage the clamp assembly 100. For example, a T-handled moveable shaft 112 may be threaded through the bore 302 extending through the first and second clamp body (114, 116). As discussed in more detail below, the moveable shaft 112 may further be coupled with one or more pins 802, 804, as illustrated in FIG. 8. The one or more pins 802, 804 may extend through the shaft 112 and be of various sizes and lengths. In another embodiment, the moveable shaft 112 may be configured to move between at least a first and second position. By rotating the movable shaft 112 between the first and second positions the clamp assembly 100 may be engaged or disengaged by a user. For example, when a rotational force is applied to a movable shaft 112 extending through the first and second clamp body (114, 116) of the disengaged clamp assembly 100, the shaft 112 may move from a first position to a second position, which may engage the assembly 100. In an additional embodiment, the moveable shaft 112 may be configured to move between more than two positions. The additional positions may move the clamp assembly 100 between the engaged and disengaged position, applying varying clamping forces to the secured service lines 202. For example, the moveable shaft 112 may be rotated from a first position, associated with a disengaged clamp assembly 100, to a third position, associated with semi-engaged clamp assembly 100, resulting in the service lines 202 coupled with the assembly 100 to be loosely secured.

In another embodiment, the clamp assembly 100 may include a cam 304, as illustrated in FIG. 3, coupled to the side of the second clamp body 116. In particular, the cam 304 may be located on a side of the second portion 108 of the second clamp body 116 and be centered on the bore 302 extending through the first and second clamp bodies (114, 116). The bore 302 may further extend through the cam 304, allowing the moveable shaft 112 to thread through the first and second clamp bodies (114, 116) and couple with the cam 304.

In one embodiment, the cam 304 is configured to removably hold a pin 804 in place when the moveable shaft 112 is set to a first position. As described above, the pin 804 may be coupled with the movable shaft 112 and, therefore, upon rotation of the moveable shaft 112, the pin 804 will also rotate. The pin 804 may rotate to different locations of the cam 304 as the movable shaft 112 is turned. In another embodiment, the pin 804 may be configured to prevent removal of the movable shaft 112 from the bore 302 extending through the cam 304 and the first and second clamp bodies (114, 116). For example, the pin 804 is sized longer than the diameter of the bore 302, thus preventing removal of the shaft 112 when coupled with the pin 804. This feature further ensures that the movable shaft 112 does not become separated from the clamp assembly 100 by preventing removal of the movable shaft 112.

In some embodiments, the cam 304 includes recessed portions in which the pin 804 may be disposed. The location of the recessed portions of the cam 304 may be associated with a particular position of the moveable shaft 112 and a particular configuration of the clamp assembly 100. For example, rotating the movable shaft 112 and, in turn, the pin 804, so that it rests in a recessed portion of the cam 304, may move the clamp assembly 100 from an engaged to a disengaged configuration. In some embodiments, the recessed portions of the cam 304 may be deeper, requiring a higher torsional force to be applied to the moveable shaft 112 to move the coupled pin 804 out of the deeper recess.

In one embodiment, the clamp assembly 100 includes a spring 110. The spring 110 may be coupled to the moveable shaft 112 and configured to bias the shaft 112 away from the second clamp body 116 and to provide the necessary tension to hold the service lines 202. A pin 802 or other obstruction may be located or coupled to the moveable shaft 112, preventing undesired removal of the spring 110. Furthermore, the pin 802 may translate force from the use of the moveable shaft 112 to compress the spring 110. It should be noted that a variety of springs 110 may be used. For example, a spring 110 with a high spring force may be used to increase the force needed to compress and rotate the moveable shaft 112. Generally, it is desirable that the spring 110 provides enough force so that a slight movement of the shaft 112 will not be enough to move the pin 802 when the clamp bodies (114, 116) are closed. At the same time, however, it is important that the spring 110 does not provide too much force, so that an ordinary individual can easily depress and turn the shaft 112 to engage or disengage the clamp assembly 100 as the case may be.

FIG. 2 illustrates an isometric view of the example clamp assembly 100 of FIG. 1 removably holding a plurality of service lines 202, in accordance with an embodiment of the present disclosure. One or more service lines 202 may extend through a clamp assembly 100, such that when the clamp assembly 100 is engaged, the service lines 202 may be secured. In one embodiment, the service lines 202 transfer resources across a drilling rig. These services that are supplied to the drilling rig via piping or cables, for example, include but are not limited to electrical, hydraulic, pneumatic, and communication services. The present disclosure provides a clamp assembly 100 which may be easily located and secured on any surface of a drilling rig and used to organize and secure service lines 202 to reduce safety hazards on the drilling rig and prevent damage to loose service lines 202.

FIG. 3 illustrates an exploded front and isometric view of the example clamp assembly 100 of FIGS. 1 and 2, in accordance with an embodiment of the present disclosure. The entire clamp assembly 100 or portions thereof may be made of metal, such as steel, and can be made of other materials, such as metal alloys like aluminum or titanium, composites such as fiber glass or carbon fiber, or even polymeric materials, such as plastics like polyetheretherketone, or combinations thereof, or any other such sufficiently strong and rigid material or combination of materials, such as can support the service lines 202 to be held thereby. It should be noted that the clamp assemblies 100 may comprise different materials. For example, the first and second portions (102, 108) of the clamp assembly 100 may be comprised of a first material, which is different from a second material that may be used to form the first and second pieces (104, 106). Thus, the first and second portions (102,

108) may be manufactured separately from the first and second pieces (104, 106), which enables the selection of optimal materials for the particular pieces. For example, a material that is easier to machine may be chosen to make more complicated portions of the clamp assembly 100, such as the second portion 108, which includes the cam 304.

In one embodiment, the first and second pieces (104, 106) may be manufactured in various sizes. Specifically, the width, length, and/or height of the first and second pieces (104, 106) may be adjusted as desired. For example, the first and second pieces (104, 106) can be manufactured with an increased thickness (i.e., width) such that a larger surface area of the first and second pieces (104, 106) is in contact with engaged service lines 202. In an embodiment, the width of the first and second pieces (104, 106) may be approximately equivalent to the width of the first and second portions (102, 108). For example, the width of the first and second pieces (104, 106) may coincide with the width of the first and second portions (102, 108) such that, when coupled, one or more sides of the first and second portions (102, 108) may be flush with one or more sides of the first and second pieces (104, 106). Alternatively, the width of the first and second pieces (104, 108) may be larger or smaller than the width of the first and second portions (102, 108).

In one embodiment, the first and second pieces (104, 106) may include a plurality of protrusions and/or indentations 306, which may be adapted to engage with the first and second portions (102, 108). For example, protrusions 306 located on a side of the first piece 104 may engage with corresponding indentations 306 on a side of the first portion 102 when the first piece 104 and first portion 102 are coupled together. In another embodiment, the protrusions and/or indentations 306 of the first and second pieces (104, 106) may be adapted to engage with a plurality of corresponding indentations and/or protrusions 306, respectively, included on the first and second portions (102, 108). For example, protrusions 306 located on a side of the first piece 104 may be adapted to engage with indentations 306 located on a side of the first portion 102, such that when the first piece 104 is coupled to the first portion 102, the protrusions 306 may engage with the indentations 306. The protrusions and/or indentations 306 may increase the frictional force between two coupled bodies and, in turn, prevent any unwanted slippage between the coupled bodies when forces are applied to them. For example, protrusions 306 on the first piece 104 may be adapted to engage indentations 306 on the first portion 102 such that if a sideways force is exerted on the first piece 104, the protrusions 306 grip the first portion 102 via the indentations 306 preventing slippage between the first piece 104 and the first portion 102.

In another embodiment, the plurality of protrusions and/or indentations 306 of the first and second pieces (104, 106) may be adapted to engage with the plurality of service lines 202 secured by the clamp assembly 100. When a service line 202 is located through an opening of the clamp assembly 100 and secured, protrusions and/or indentations 306 may engage with the surface of the service line 202. The protrusions and/or indentations 306 may then further secure the service line 202 and prevent the service line 202 from slipping through the clamp assembly 100, if desired.

Figure 4:
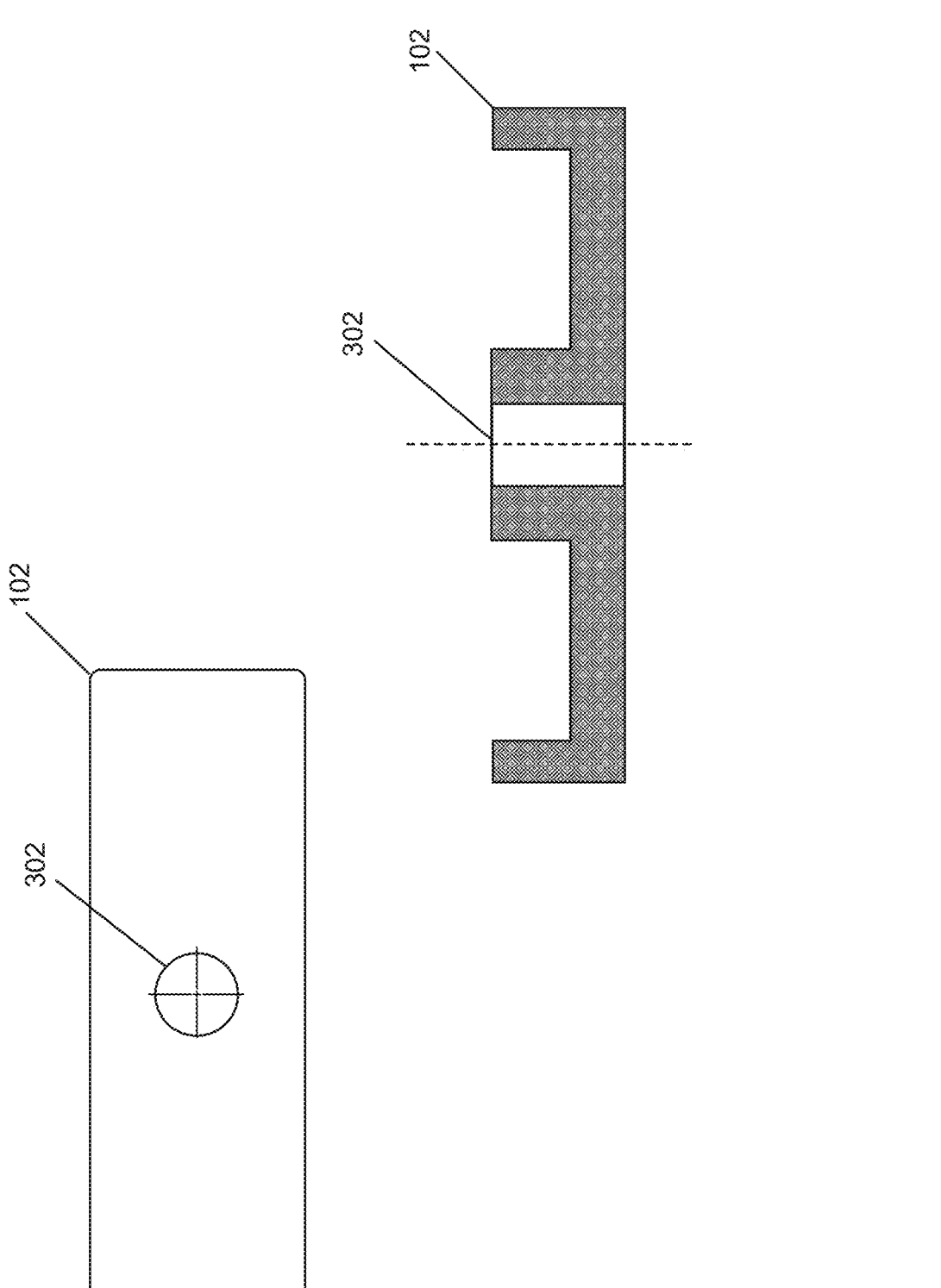
FIG. 4 illustrates a series of views of a first portion of an example clamp assembly, in accordance with an embodiment of the present disclosure.

FIG. 4 illustrates a series of views of a first portion 102 of an example clamp assembly 100, in accordance with an embodiment of the present disclosure. In one embodiment, a first portion 102 of the first clamp body 114 may be configured to be couplable with a first piece 104. As illustrated in FIG. 4, the first portion 102 may include depressions sized to accept the first piece 104. In another embodiment, the bore 302 extending through the first clamp body may be located on or near the central axis of the first portion 102. Additionally, and/or alternatively, the bore 302 may be located at any other point on the first portion 102, such that the bore 302 extends through the first and second clamp bodies (114, 116) at an offset.

Figure 5:
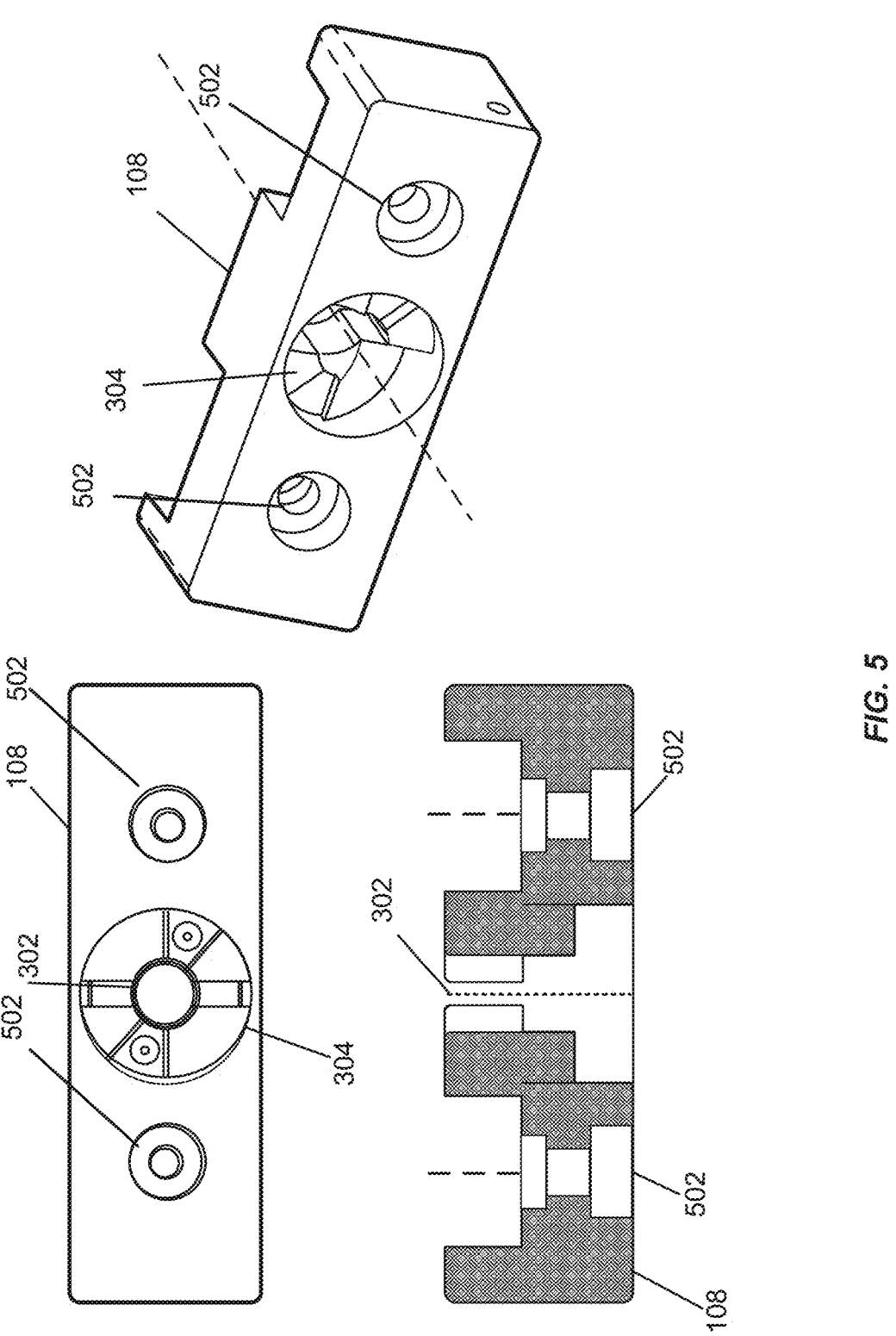
FIG. 5 illustrates a series of views of a second portion of an example clamp assembly, in accordance with an embodiment of the present disclosure.

FIG. 5 illustrates a series of views of a second portion 108 of an example clamp assembly 100, in accordance with an embodiment of the present disclosure. In some embodiments, the second portion 108 of the second clamp body 116 may be configured to include a cam 304. The cam 304 may be located on the same axis as the bore 302, allowing for the movable shaft 112 to be threaded through the bore 302 and the cam 304, respectively. In one embodiment, the second portion 108 further includes one or more locations 502 configured to secure the clamp assembly 100 to a surface on the drill rig. For example, a series of bolts may be threaded through the provided openings 502 on the second clamp body 116, which can then secure the clamp assembly 100 to a surface configured to accept the series of bolts. Those skilled in the art will appreciate that the number, the size, and the shape of the locations 502 configured to secure the clamp assembly 100 to a surface can vary as desired. Furthermore, it should be appreciated that a variety of methods may be used to couple the clamp assembly 100 to a surface. For example, the clamp assembly 100 may be welded directly to a surface of the drilling rig.

Figure 6:
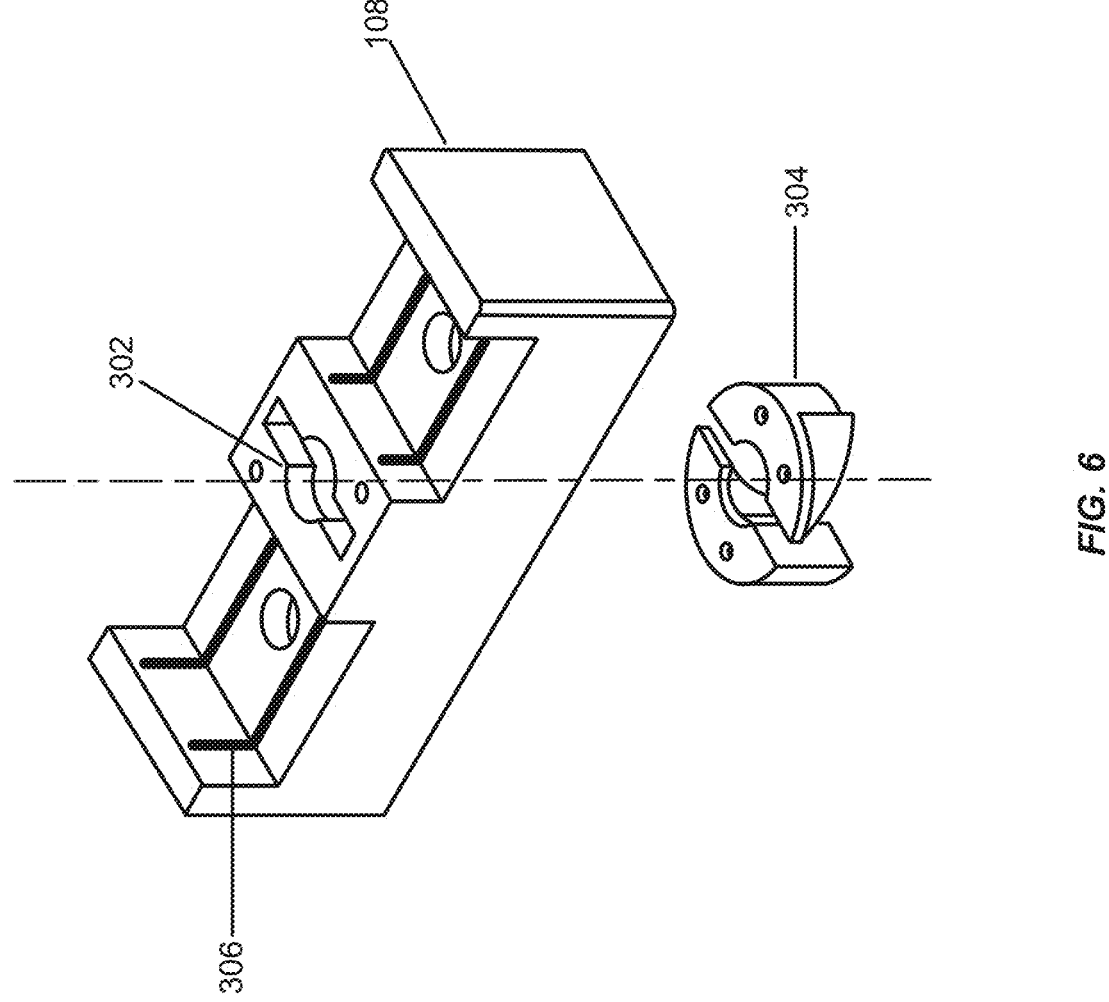
FIG. 6 illustrates an isometric view of an exemplary cam and the second portion of an example clamp assembly, in accordance with an embodiment of the present disclosure.

FIG. 6 illustrates an isometric view of an exemplary cam 304 and the second portion 108 of an example clamp assembly 100, in accordance with an embodiment of the present disclosure. As discussed in detail above, the second clamp body 116 may include a cam 304 located on a side of the second portion 108 and centered on the same axis of the bore 302. In one embodiment, the cam 304 may be located on a removable section, which is, itself, coupled to the side of the second portion 108 of the second clamp body 116. For example, the cam 304 is configured as an insert, which can be removed from the second clamp body 116 and/or replaced. By providing a removable cam 304, the cam 304 may be separately machined before it is coupled to the second portion 108, allowing for more manufacturing flexibility of the clamp assembly 100. Furthermore, since a pin 804 is disposed in the cam 304 and repeatedly glides across the surface of the cam 304, the cam 304 may wear down quicker than other parts of the clamp assembly 100. Therefore, removal and replacement of the cam 304, as opposed to replacement of the entire assembly 100, allows for reduction of waste, as well as a cost-effective method of maintenance. In another embodiment, the cam 304 can be comprised a material that is different from the material of the second portion 108 of the second clamp body 116. For example, an alternative material, such as steel or titanium, may be chosen to machine the cam 304 based on the materials characteristics.

As depicted in FIG. 6, one or more protrusions and/or indentations 306 may be located on the first and second portions (102, 108). The protrusions and/or indentations 306 may be configured to couple with the first and second pieces (104, 106), providing a higher friction surface to prevent slippage between the first and second portions (102, 108) and the first and second pieces (104, 106).

FIG. 7 illustrates a series of views of the exemplary cam 304 of a clamp assembly 100, in accordance with an embodiment of the present disclosure. A cam 304 may be provided, which may be configured to couple to the second clamp body 116. In one embodiment, the cam 304 may include one or more slots, of which a pin 804 coupled to the movable shaft 112 may be disposed. The one or more slots may be associated with one or more positions of the clamp assembly 100. For example, when the coupled pin 804 rests in a first slot on the cam 304, the moveable shaft 112 is at the first position. The depth of the slots on the cam 304 may vary depending on what force is desired for turning the movable shaft 112. For example, a slot on the cam 304 may be deeper than the diameter of the pin 804; thus, to remove the pin 804 from the slot to allow the movable shaft 112 to rotate, a larger force may be required to lift the pin 804 than would be required if the slot were shallower.

Figure 8B:
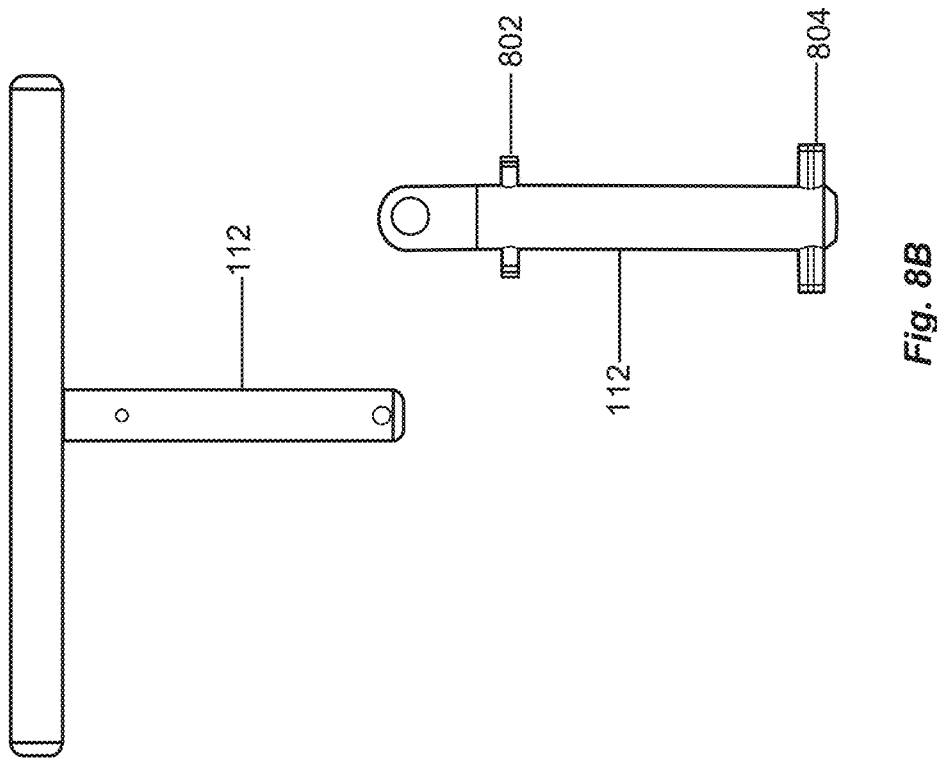
FIGS. 8A and 8B illustrates a series of views of exemplary handles of a clamp assembly, in accordance with an embodiment of the present disclosure.
Figure 8A:
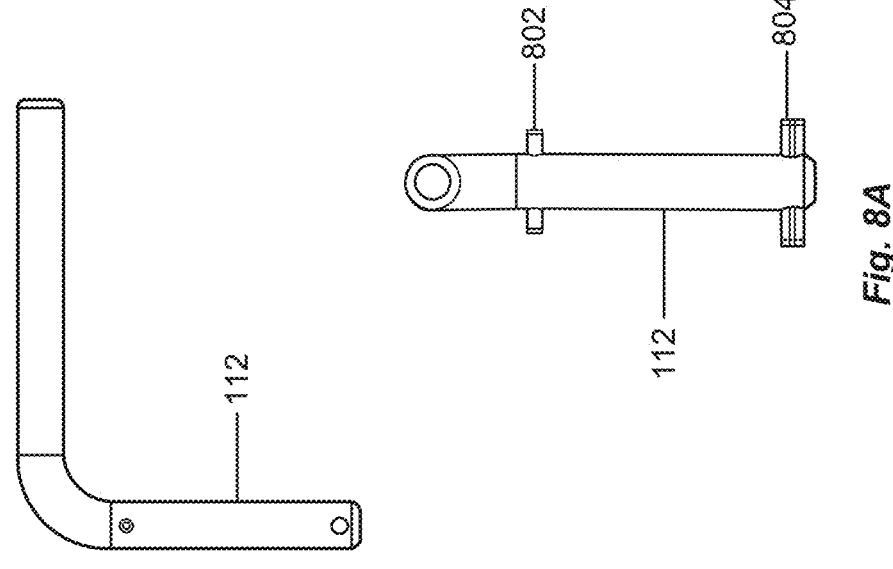

FIGS. 8A and 8B illustrate a series of views of exemplary handles 112 of a clamp assembly 100, in accordance with an embodiment of the present disclosure. As previously discussed, the movable shaft 112 may be configured into an L-shape or T-shape, as illustrated in FIG. 8. However, those skilled in the art will appreciate that any suitable shaft shape may be used. In an additional embodiment, the movable shaft 112 may be configured such that it is couplable to a tool adapted to apply a rotational force to the movable shaft 112. The tool can be used to apply a rotation force to the coupled movable shaft 112 which engages the clamp assembly 100 and secures the service lines 202. For example, the movable shaft 112 may be configured such that it is couplable to a hex key tool. Then, by applying a rotational force to the hex key tool, the movable shaft 112 may be turned, engaging the clamp assembly 100 and securing one or more service lines 202. In some embodiments, the tool may be tethered to the clamp assembly 100. Thus, the tool may be within reach of the clamp assembly 100 to easily and quickly engage or disengage the clamp assembly 100.

FIG. 9 illustrates a series of views of an exemplary base piece 902 of a clamp assembly 100, in accordance with an embodiment of the present disclosure. It should be noted that the clamp assembly 100 may be coupled to a surface of the drill rig using various methods. In one embodiment, a base piece 902 can be provided and coupled to the second portion 108 of the second clamp body 116. The base piece 902 may be adapted to couple the clamp assembly 100 to a surface of the drilling rig. Thus, the clamp assemblies 100 can be secured to surfaces across a drilling rig and placed at strategic and/or ideal locations for securing a plurality of service lines 202. In some embodiments, the base piece 902 may include openings configured to accept pieces designed to attach the clamp assembly 100 to the base piece 902. For example, the base piece 902 may include threaded openings designed to accept threaded bolts that extend through the second portion 108 of the second clamp body 116 and into the base piece 902. In another embodiment, the base piece 902 may be secured to a surface using methods such as welding or using materials such as epoxies or polyurethane based adhesives.

Figure 10:
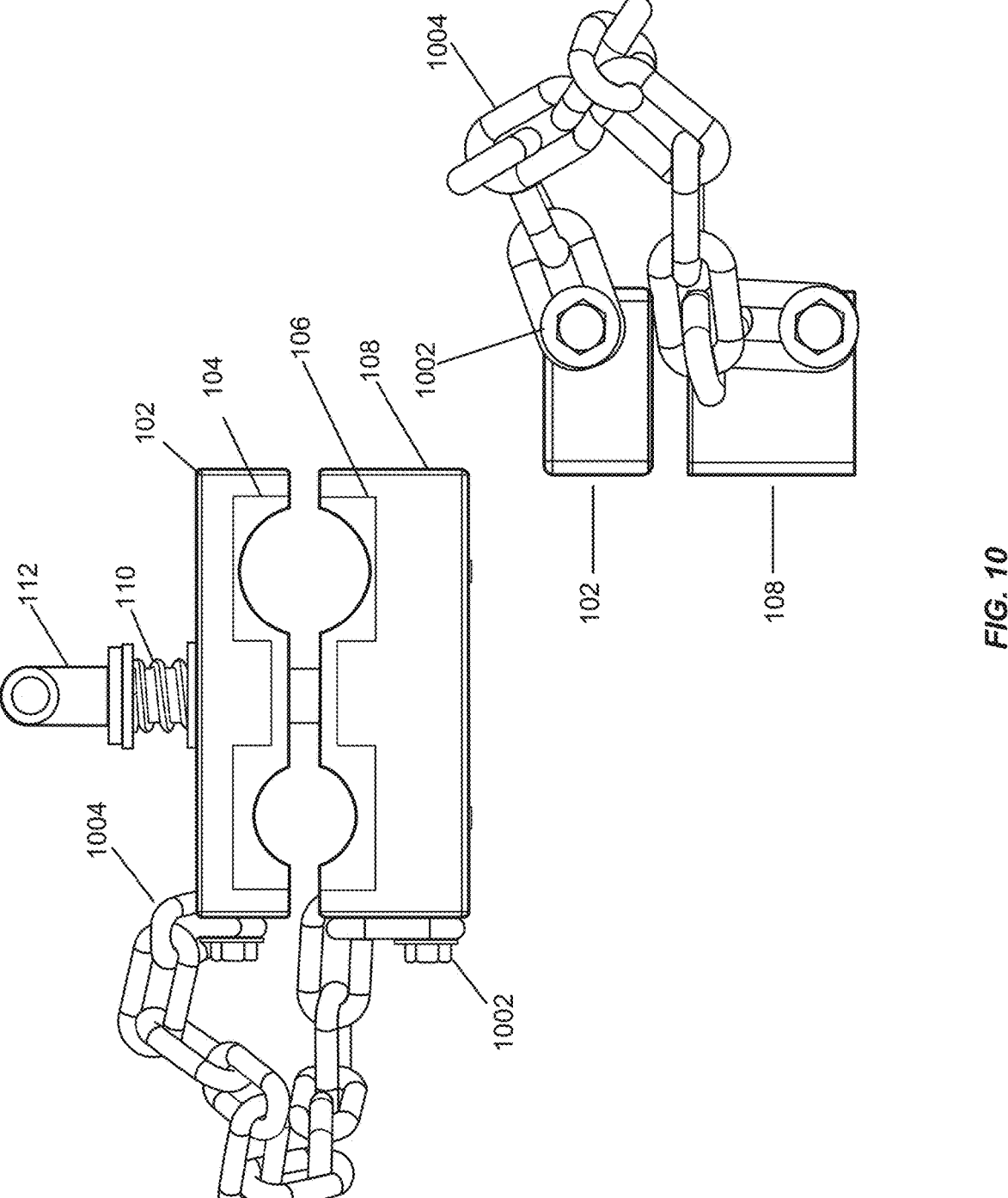
FIG. 10 illustrates a series of views of an exemplary tether attached to a clamp assembly, in accordance with an embodiment of the present disclosure.

FIG. 10 illustrates a series of views of an exemplary tether 1002 attached to a clamp assembly 100, in accordance with an embodiment of the present disclosure. In further embodiments, the clamp assembly 100 may include a tether 1002 which may be configured such that at least the first clamp body 114 is attached to the second clamp body 116. The tether 1002 can be of a conventional type, such as those consisting of segments bolted or otherwise attached together. As shown in FIG. 10, for example, the illustrated tether 1002 has a first and second end, which can be bolted or otherwise attached to the first and second clamp bodies (114, 116) of the clamp assembly 100. By tethering the two clamp bodies (114, 116) together, loss of one of the clamp bodies (114, 116) may be prevented as the tether 1002 allows for easy retrieval of the clamp body (114, 116) if dropped.

It will be appreciated that, although the tether 1002 shown in FIG. 10 has a particular size and width, the clamp assembly 100 may include tethers 1002 with different sizes, lengths, widths, or the like.

Figure 11:
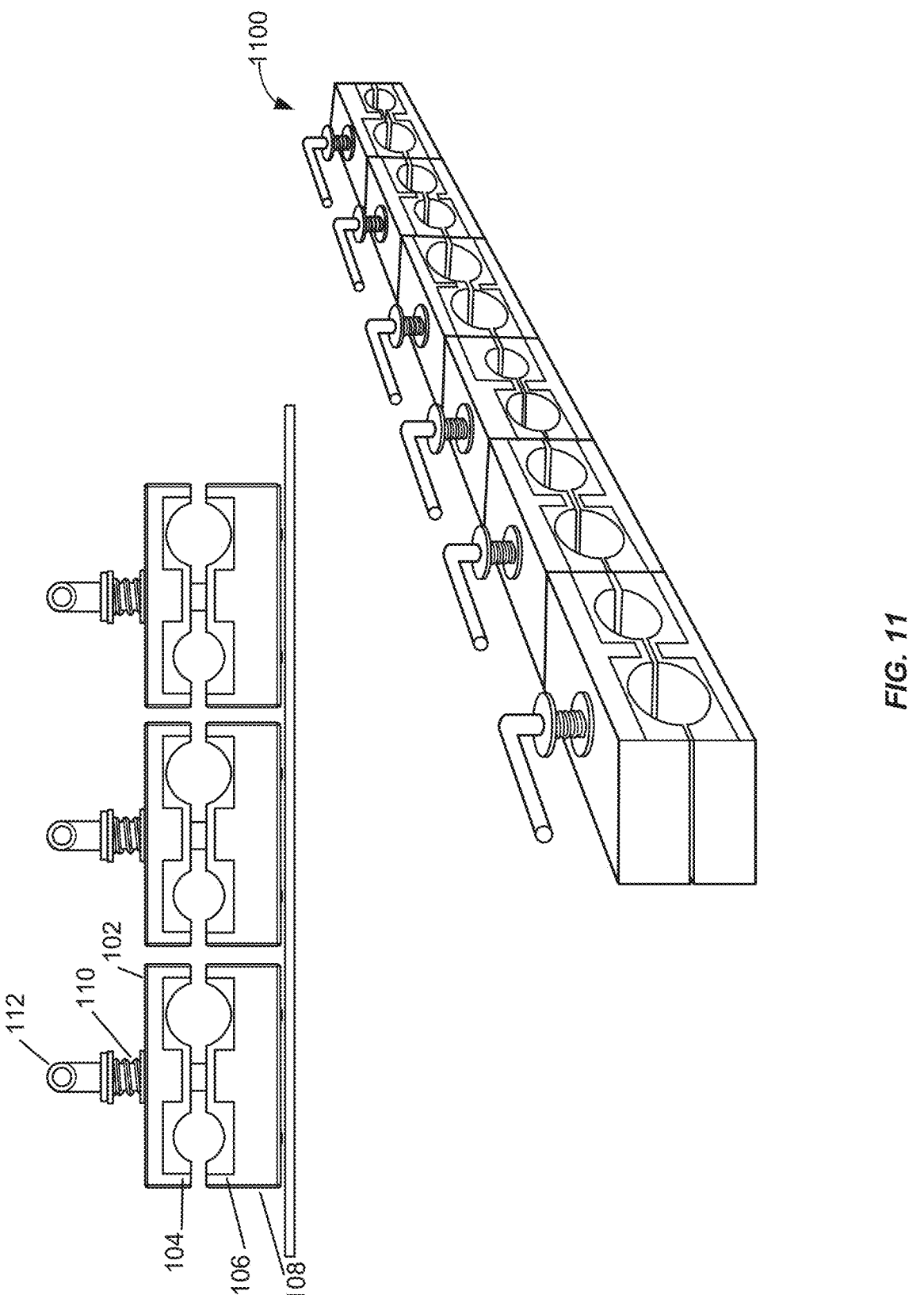
FIG. 11 illustrates a side view of an exemplary assembled service line holding system implementing clamp assemblies, in accordance with an embodiment of the present disclosure.

FIG. 11 illustrates a side view of an exemplary assembled service line holding system 1100 implementing clamp assemblies 100, in accordance with an embodiment of the present disclosure. As illustrated in FIG. 11, each of the opposing clamp assemblies 100 can be located such they are in contact and adjacent to a corresponding connecting clamp assembly 100. Similarly, each of the opposing clamp assemblies 100 have a first clamp body 114 and a second clamp body 116 which are in contact with the corresponding opposing clamp assembly 100, and further define an opening between the two opposing clamp assemblies 100. For example, three clamp bodies with two openings each can be coupled together to create space to secure six service lines 202 alongside each other. In an additional embodiment, a rack can be provided to further increase the number of openings for securing service lines 202. For example, the rack, coupled to the drilling rig, may be used to removably couple one or more clamp assemblies 100 to the rack and thus also to the drilling rig. Therefore, the rack can be provided to removably handle and secure the desired number of service lines 202. As previously described in detail in FIG. 1, it will be appreciated that the size and shape of the openings defined by the opposing clamp assemblies 100 can be determined by the size and shape of the clamp assemblies 100, and, as illustrated in FIG. 11, the openings can vary accordingly in size and shape as may be desired to removably hold various sizes and shapes of cables, pipes, and service lines 202.

Drilling rigs and the operations of drilling rigs can require resources of various types, including electrical, pneumatic, and hydraulic energy, which may be provided by sources not present on the drilling rig. As a results, service lines 202 (e.g., cables, wires, pipes, etc.) may be used to bring these resources to the appropriate locations, such as the equipment on or near the drill rig that uses the resources. The clamp assemblies 100 as described herein may be implemented to secure service lines 202 for a drilling rig as well as for the equipment associated with the operations of the drilling rig in a variety of locations on the rig and/or at the drilling site (i.e., the area that includes the drilling rig, its associated equipment, housing for personnel, and so forth). For example, one or more "booms" may be used to carry service lines 202 from a source location to a skid post, such as disclosed in U.S. Pat. No. 10,280,693 issued May 7, 2019, entitled MOBILE UTILITY ARTICULATING BOOM SYSTEM, which is hereby incorporated by reference as if fully set forth herein. In another example, service lines 202 may run underneath a boom, on or above the top surface of a skid, underneath the skid, or within a bottom frame of the skid to connect the boom at a first location, such as one end of the skid that is disposed toward the service sources, to a boom at a second location, such as the end of the skid disposed toward the drilling rig. The clamp assemblies 100 disclosed herein may be used to removably secure service lines 202 along portions of the boom(s) and/or skid(s).

By implementing one or more clamp assemblies 100 to removably secure service lines 202 located on and/or near a drilling rig or equipment associated with the operations of the drilling rig, the services lines 202 may be kept separate from one another, organized, and untangled. For example, a service line 202 carrying water from a water source to various locations associated with drilling rig operations can be separated from nearby service lines 202 providing elec-trical energy. Maintaining service line 202 organization can be important for, but not limited to, safety purposes, minimizing hazards associated with unsecure service lines 202, and/or, ease of assembly and maintenance.

FIG. 12 illustrates a flow for using an example clamp assembly 100 to secure service lines 202, in accordance with an embodiment of the present disclosure. In operation, the clamp assembly 100 may be implemented as follows: The flow begins with operation 1202, where an exemplary clamp assembly 100 is provided. Then as detailed in operation 1204, a portion of the clamp assembly 100 is secured to portion of a drilling rig. For example, the lower body of the clamp assembly 100 may be secured to a boom on the drilling rig via a base piece 902 secured to a portion of the boom. The flow further includes operation 1206, where a plurality of service lines 202 may be located through a plurality of openings of the clamp assembly 100. For example, a series of service lines 202 providing electricity to a section of the drilling rig may extend through a clamp assembly 100. The flow next includes operation 1208, where the movable shaft 112 of the clamp assembly 100 is pressed down. Last, the flow includes operation 1210, where the movable shaft 112 is then rotated to a first position. The first position being configured to removably secure the first and second clamp bodies (114, 116) together and removably hold the plurality of service lines 202. For example, a shaft 112 of a clamp assembly 100 can be pushed down and rotated to cause the clamp assembly 100 to compress, securing the service lines 202 located through the openings of the clamp assembly 100.

Figure 13:
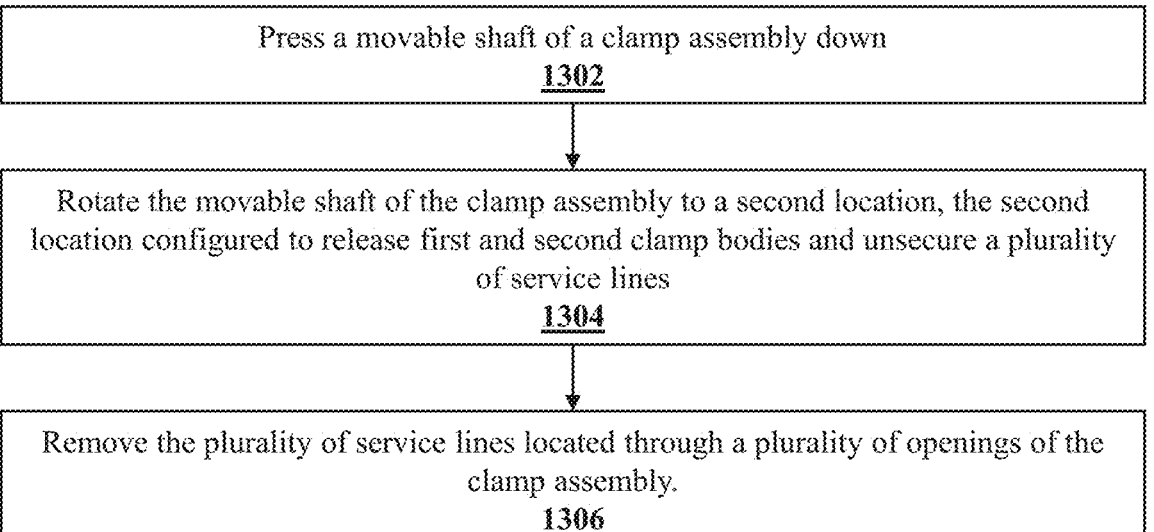
FIG. 13 illustrates an additional flow for disengaging the example clamp assembly to unsecure service lines, in accordance with an embodiment of the present disclosure.

FIG. 13 illustrates an additional flow for disengaging the example clamp assembly 100 to unsecure service lines 202, in accordance with an embodiment of the present disclosure. The clamp assembly 100 may be disengaged to release the secured service lines 202 as follows: First, the flow includes operation 1302, where the movable shaft 112 of the clamp assembly 100 is pressed down. Next, the flow includes operation 1304, where the movable shaft 112 is rotated to a second location. The second location being configured to release the first and second clamp bodies (114, 116) and, in turn, unsecure the plurality of services lines 202. For example, by pressing down and rotating the movable shaft 112 of the clamp assembly 100 to a particular location, the clamp assembly 100 may release allowing the service lines 202 to be removed. Finally, as depicted in operation 1306, the plurality of service lines 202 located through the plurality of openings of the clamp assembly 100 can be removed.

It should be noted that the present disclosure illustrates and describes a quick connect hose clamp with a great deal of efficiency and ease of use, among other advantages. For example, several clamp assemblies 100 may be attached to a surface, such as a boom, at four or so intervals along the length of the boom, such as if it is desired to avoid any slack in cabling or other flexible service lines 202 to be secured by the clamp assemblies 100. However, other booms may have fewer or more clamp assemblies 100 than the other boom or may have the same number.

It will be appreciated from the illustrations and description provided that the quick connect clamp as disclosed herein provides a number of advantages. One of the advantages of the quick connect clamp of the present disclosure is that it can be used to expeditiously secure service lines 202 to surfaces across a drilling rig such that the service lines 202 can be easily organized and run in particular configurations. For example, multiple clamp assemblies 100 can be aligned to secure hanging service lines 202 which allow the tension in the service lines 202 to be adjusted so that there is no slack and resulting droop of the lines. By exerting a force on the movable shaft 112, the clamp assembly 100 may be quickly engaged and disengaged. For example, by briefly applying a rotational force to the shaft 112, such that the shaft 112 moves to a first position, the clamp assembly 100 can quickly be engaged. In turn, by applying a rotational force to the shaft 112, such that the shaft 112 moves to a second position, the clamp assembly 100 can be quickly disengaged.

An additional advantage of the quick connect hose clamp of the present disclose is that the clamp assemblies 100 can secure service lines 202 in locations that are out of the way. Loose service lines 202 can pose a safety risk and act as an obstacle, additionally, treading on service lines 202 or crossing service lines 202 with machinery may damage the lines. By using a clamp assembly 100 to organize and secure lines the likelihood of accidents resulting from unsecured service lines 202 and damage to service lines 202 may be reduced.

While the present invention has been shown and described in its preferred embodiment and in certain specific alternative embodiments, those skilled in the art will recognize from the foregoing discussion that various changes, modifications, and variations may be made thereto without departing from the spirit and scope of the invention as set forth in the claims. For example, those skilled in the art will appreciate that the foregoing description and figures generally depict a clamp assembly 100 with a particular configuration, such as a two clamp bodies (114, 116) that each consist of two pieces, but other configurations involving more or less parts comprising the clamp bodies (114, 116) may be used. In addition, other means for engaging the clamp assembly 100 can be provided beyond those shown and describe above. For example, FIGS. 8A and 8B show a L-shaped and T-shaped handles, respectively; However, alternative handles may be used in tandem with the clamp assembly 100, or, instead of a permanently coupled handle, the movable shaft 112 may be configured in such a way as to allow a standard tool to be used. For example, the movable shaft 112 may be configured to engage with a hex key such that by coupling the hex key with the movable shaft 112, the clamp assembly 100 can be secured.

For convenience, the clamp assemblies 100 depicted in the Figures are shown positioned horizontally, however, it should be noted that the clamp assembly 100 embodied herein can be implemented in a variety of positions. For example, with the ground as a reference point, one or more clamp assemblies 100 may be positioned at various angles and in various locations including, but not limited to, vertically, upside down and/or inverted, at varying angles, etc.

Hence, the embodiments and specific configurations, dimensions, materials, and the like are merely illustrative and do not limit the scope of the invention or the claims herein.

What is claimed is:

1. A clamp assembly for securing one or more service lines for a drilling rig and/or associated equipment, the clamp assembly comprising:
  a first clamp body comprising a first portion and a first piece;
  a second clamp body comprising a second portion and a second piece, wherein the first piece and the second piece define at least one or more openings adapted to removably secure one or more service lines extending therethrough;

a cam coupled to a side of the second portion of the second clamp body, wherein a bore extends through the cam and the first and second clamp bodies;
  a movable shaft extending through the bore and associated with a pin, wherein the movable shaft and the pin are rotationally coupled relative to one another, wherein
    the movable shaft is configured to move between a first position and a second position to removably secure the one or more service lines, wherein the movable shaft in the first position is configured to removably hold the first and second clamp bodies together and removably hold the one or more service lines; and
  a spring coupled to the movable shaft and configured to bias the first clamp body from the second clamp body, wherein the cam is configured to prevent the pin from passing through the bore of the cam for preventing removal of the movable shaft from the bore.

2. The clamp assembly of claim 1, wherein the one or more openings are configured to removably secure one or more service lines of equal diameter.

3. The clamp assembly of claim 1, wherein the one or more openings are configured to removably secure two or more service lines of different diameters.

4. The clamp assembly of claim 1, wherein the first and second portions are comprised of at least a first material and the first and second pieces are comprised of at least a second material different from the first material.

5. The clamp assembly of claim 4, wherein the cam is comprised of at least a third material different from at least the first material or the second material.

6. The clamp assembly of claim 1, where the cam is located on a removable section coupled to the side of the second portion.

7. The clamp assembly of claim 1, further comprising a tether configured to attach to at least the first clamp body and the second clamp body.

8. The clamp assembly of claim 1, further comprising a base piece coupled to at least the second portion and adapted to couple the clamp assembly to a surface.

9. The clamp assembly of claim 1, wherein the first and second clamp bodies are configured to be removably secured to at least first and second additional clamp bodies.

10. The clamp assembly of claim 1, further comprising a rack configured to removably couple one or more clamp assemblies to a surface.

11. The clamp assembly of claim 1, wherein the movable shaft is configured to couple to a tool adapted to apply a rotational force to the movable shaft.

12. The clamp assembly of claim 1, further comprising a tether configured to tether the movable shaft to at least the first or second clamp bodies.

13. A clamp assembly for securing one or more service lines for a drilling rig and/or associated equipment, the clamp assembly comprising:
  a first clamp body and a second clamp body defining at least one or more openings adapted to removably secure one or more service lines extending therethrough, the first and second clamp bodies adapted to removably hold a movable shaft extending through a bore, wherein the bore extends through a cam and the first and second clamp bodies;
  the movable shaft associated with a pin, wherein the movable shaft and the pin are rotationally coupled relative to one another;

the cam configured to removably hold together the first clamp body and the second clamp body, the cam located on a side of the second clamp body; and a spring coupled to the movable shaft.

14. The clamp assembly of claim 13, wherein the one or more openings are configured to removably secure two or more service lines of different diameters.

15. The clamp assembly of claim 13, wherein the first clamp body comprises a first portion and a first piece, and the second clamp body comprises a second portion and a second piece.

16. The clamp assembly of claim 15, wherein the first and second portions are comprised of at least a first material and the first and second pieces are comprised of at least a second material different from the first material.

17. The clamp assembly of claim 13, wherein the movable shaft is configured to move between at least a first position and a second position, wherein the first position is configured to removably secure the first and second clamp bodies together and removably hold the one or more service lines.

18. The clamp assembly of claim 13, wherein the cam is configured to prevent the pin from passing through the bore of the cam for preventing removal of the movable shaft from the bore.

19. The clamp assembly of claim 13, wherein the spring is configured to bias the first clamp body from the second clamp body.

20. The clamp assembly of claim 13, wherein the first and second clamp bodies are configured to be removably secured to at least first and second additional clamp bodies.

\* \* \* \* \*